April 21, 1931.  J. H. McEACHERN  1,801,749
SHUT-OFF VALVE AND CONTROL FOR TANK TRUCKS
Filed Feb. 2, 1924  2 Sheets-Sheet 1
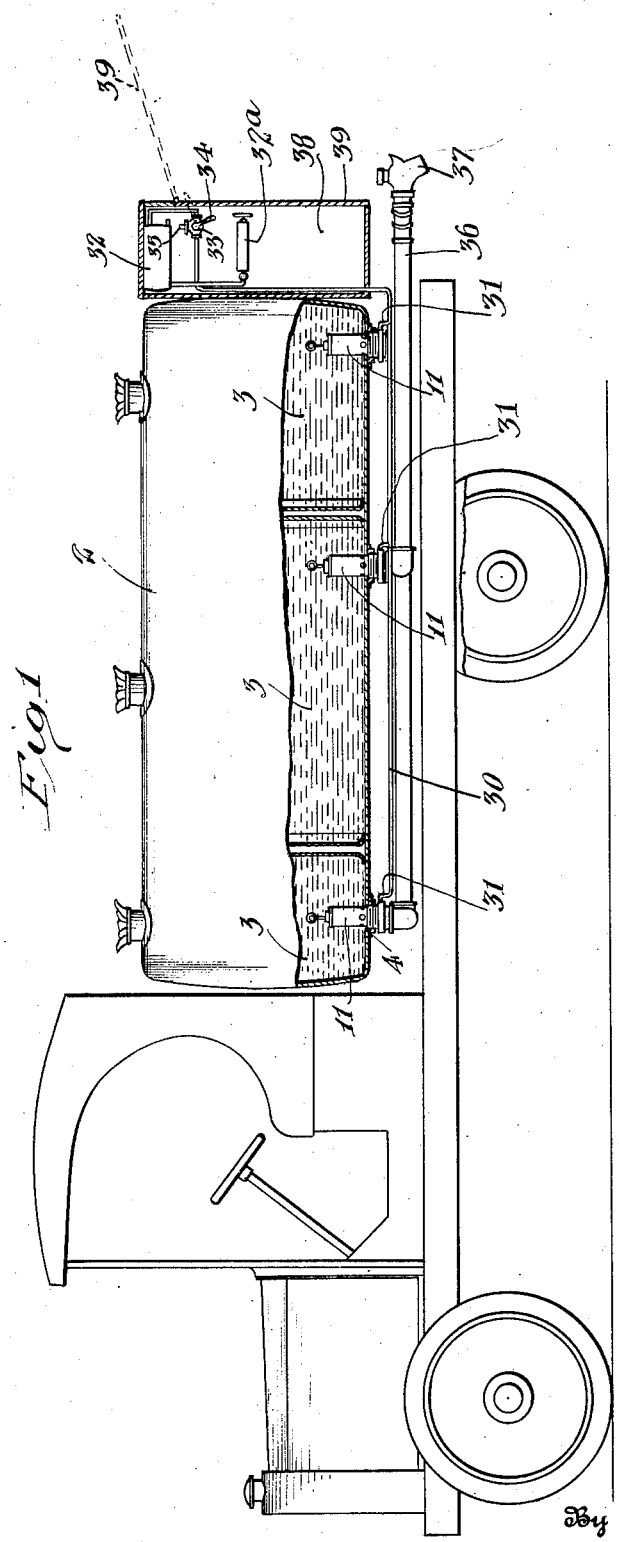
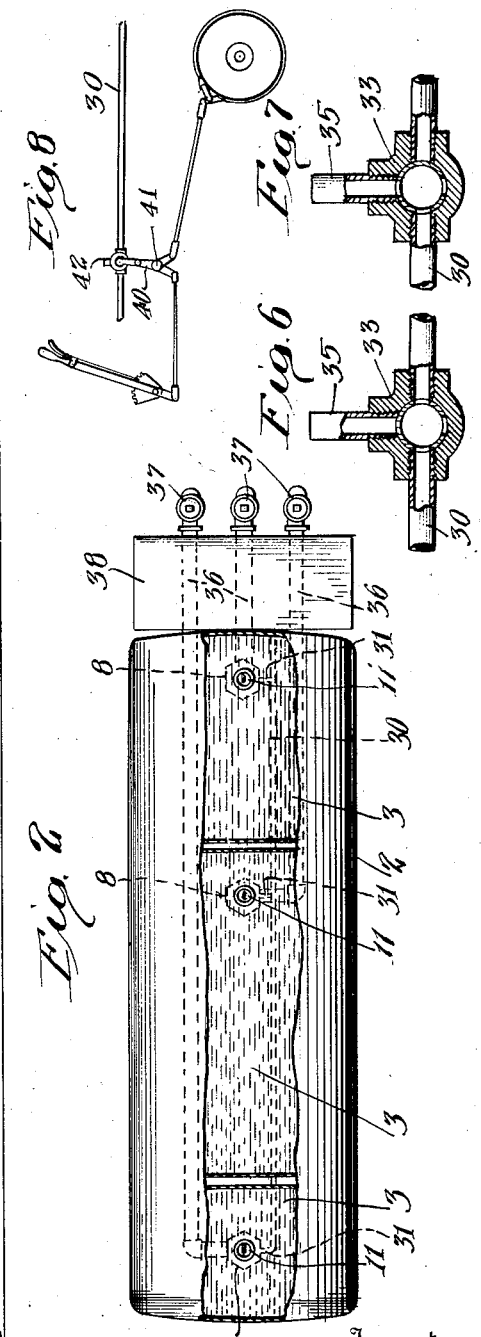
Inventor
Joseph H. McEachern
By Lyon & Lyon
Attorneys April 21, 1931. J. H. McEACHERN 1,801,749
SHUT-OFF VALVE AND CONTROL FOR TANK TRUCKS
Filed Feb. 2, 1924 2 Sheets-Sheet 2
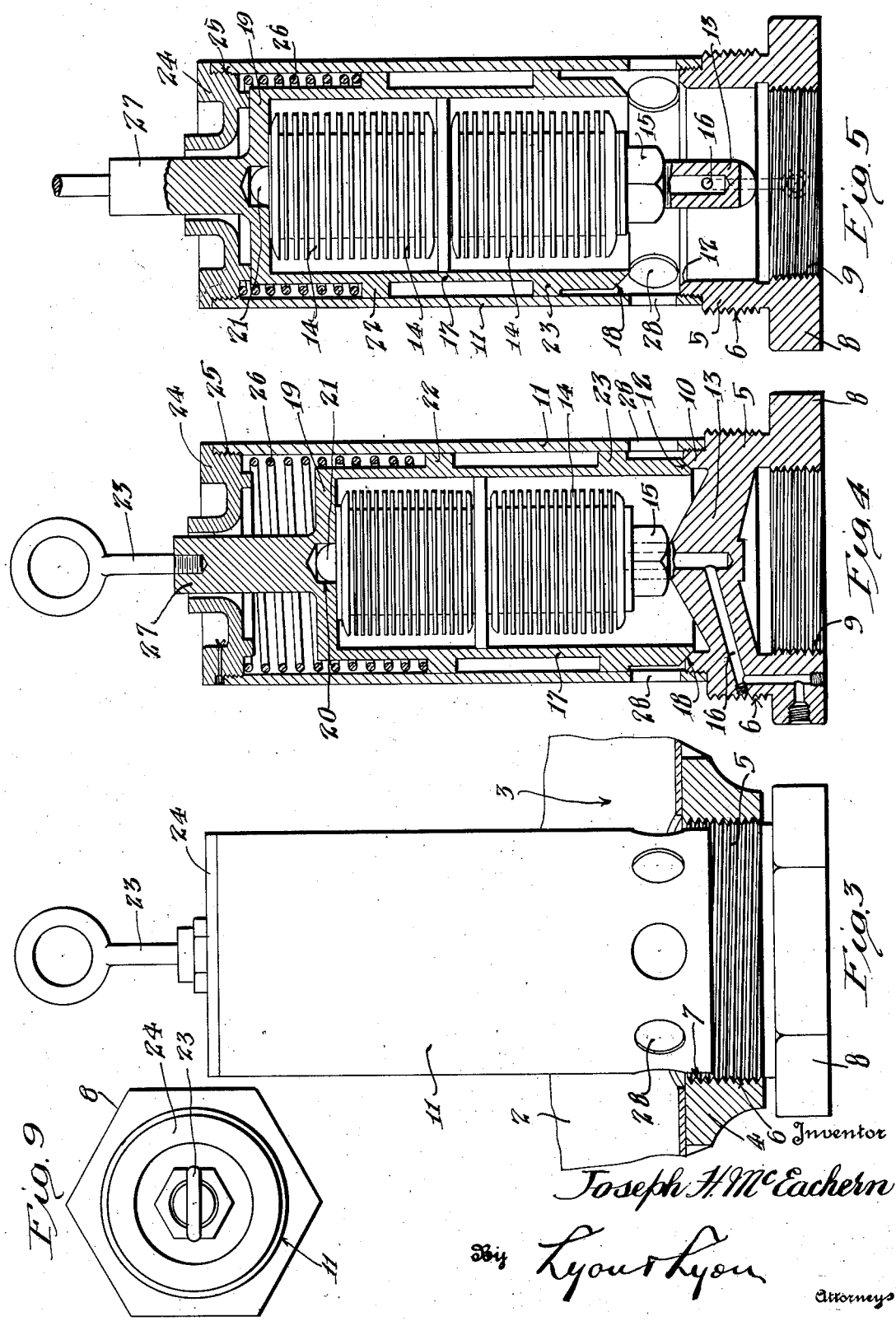

Patented Apr. 21, 1931

1,801,749

UNITED STATES PATENT OFFICE

JOSEPH HAMBRIC McEACHERN, OF SAN FRANCISCO, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE

SHUT-OFF VALVE AND CONTROL FOR TANK TRUCKS

Application filed February 2, 1924. Serial No. 690,287.

This invention relates to a shut-off valve particularly adapted for use on a tank truck and a control for the valve.

Tank trucks of the type customarily employed for transporting petroleum liquids are provided with one or more discharge lines having a faucet on the end of the line. In the case of collision, accident, or other cause which results in the breaking or leaking of the discharge line or faucet, the fire hazard resulting from leakage or spilling of inflammable petroleum fluid is a source of danger to life and property. Laws are now in effect in various sections of the country, and under contemplation in other sections, requiring internal shut-off valves for tank trucks adapted to seal the fluid receptacle at the point of connection of a discharge line. This insures that the contents of the tank will not be emptied or spilled in the event the discharge line or its faucet be damaged or broken. Various types of such internal shut-off valves employing mechanical control have been suggested, but are subject to certain disadvantages. Among these disadvantages are the space taken up by mechanical linkage and controls; difficulty of application to tank trucks not specially built therefor; difficulty of maintaining adjustment during wear, particularly where a plurality of valves are operated from a common mechanical control; danger of exposed mechanical controls becoming damaged or displaced, destroying adjustment, particularly when mechanical linkages are positioned on top of the truck tank where operators step upon same in filling the tank; excessive weight of mechanical linkage and controls; noise resulting from vibration of mechanical linkage; necessity of repacking glands and leakage of improperly packed glands. and necessity of lubricating moving mechanical elements, with consequent danger of wear, rusting and jamming of parts when lubrication is neglected.

The object of this invention is to provide a pressure controlled internal valve for tank trucks.

Another object of this invention is to provide a valve and control of the character referred to which will be economical in manufacture and installation and positive and convenient in use.

A further object of this invention is to provide a valve of the above character which may be readily installed upon tank trucks now in operation without the necessity of remodeling.

A further object of this invention is to provide a valve and control for the above-mentioned purpose which will eliminate the necessity for the employment of packing glands.

A further object of the invention is to provide an internal valve and control for the above mentioned purpose which will occupy a small space and will be light in weight.

A further object of the invention is to provide a valve and control for the above-mentioned purpose which is not dependent upon mechanical adjustment and which will not be incapacitated by use and wear.

A further object of the invention is to provide an internal valve and control for the above mentioned purpose, of such type and construction that the valve would remain unopened upon accident to the truck or control.

A further object of the invention is to provide an internal valve and control for the above mentioned purpose of a type which readily permits the incorporation in the control of a safety feature to insure that the valve is closed except when otherwise desired.

A further object of the invention is to provide an internal valve of a character and a control therefor of such kind that a plurality of the valves may be employed on a tank truck having a plurality of fluid compartments.

Other objects and various advantages of the invention will appear from the following description of the application of the invention to a tank truck, it being understood that the application shown is by way of example and that the invention is not specifically limited thereto.

In the drawings:

Figure 1 shows a tank truck partly in section, to which the invention has been applied.

Figure 2 is a top plan view of the tank illustrated in Fig. 1, showing the relative positions and connections of the discharge pipes and internal valves.

Figure 3 is an assembly view of the internal valve comprising a feature of the invention and illustrating the mounting of the valve on a flange affixed to the under side of the tank.

Figure 4 is a vertical section through the internal valve illustrated in Fig. 3 and shows the same in closed position.

Figure 5 is a vertical section take at right angles to Fig. 4 and illustrates the internal valve in opened position.

Figure 6 is a detail showing the three-way valve employed in the pressure line in sealed position.

Figure 7 is a detail view of the three-way valve shown in Fig. 6, but illustrating the valve in vented position.

Figure 8 is a diagrammatic view illustrating a vent positioned in the pressure line connected with the emergency brake lever of the truck.

Figure 9 is a plan view of the internal valve shown in the preceding figures.

Referring to the drawings: the truck illustrated in Fig. 1 carries a tank 2 of the type provided with a plurality of fluid compartments 3. A pipe flange 4 is secured to the bottom of the tank at each compartment. An internal valve of the type illustrated in Fig. 3 is mounted within each compartment by means of the pipe flange 4.

The internal valve above mentioned has a base 5 provided with exterior threads 6 to fit and engage the threads 7 of the pipe flange 4. A nut 8 is formed in the base 5 to permit the base 5 to be screwed into the flange 4 and secured on the under side of the tank. An inner thread 9 is formed on the base 5 to receive a discharge pipe. The base 5 is provided with an upwardly extending lip 10 which is exteriorly threaded to receive and support a valve housing 11, and the lip is beveled on its inner corner to form an annular valve seat 12. A web 13 is centrally formed on the base 5 permitting the passage of fluid through the base and providing a support for metal bellows 14, which metal bellows are mounted upon the web 13 by means of the threaded connection 15. A passageway 16 extends from the exterior of the base and communicates with the bellows 14. A valve sleeve 17 is positioned in the housing 11 and is exteriorly beveled at its lower end 18 to seat upon the valve seat 12. The head 19 of the valve sleeve 17 is recessed at 20 to receive a projection 21 carried at the top of the bellows 14. The valve sleeve 17 is provided with an upper rib 22 and a lower rib 23 adapted to bear against the inside of the housing 11 and centrally align the valve sleeve. A cap 24 is secured to the housing 11 by means of a thread 25. A compression spring 26 is positioned under the head 24 and surrounds the upper portion of the valve sleeve 17. The spring 26 thrusts at its lower end on the upper rib 22 of the valve sleeve 17 and at its upper end against the cap 24, thereby normally urging the valve sleeve downward to closed position. The valve sleeve 17 is provided with a central and upward extension 27 which projects through the cap 24 and is provided with an eyebolt 23 for enabling the valve sleeve 17 to be manually raised from within the tank. The housing 11 is provided with a plurality of circumferentially arranged ports 28.

A pressure line 30 (see Fig. 1) communicates with the bellows 14 through the passageway 16 formed in the base 5 of the internal valve. The pressure line 30 is provided with the necessary number of connections 31 to serve the number of valves which may be required to provide each of the discharge lines for the various compartments of the tank with an internal valve. The pressure line 30 extends from a pressure reservoir 32, and a suitable pump 32a serves to charge the reservoir 32. A three-way valve 33 is interposed in the pressure line 30 and is provided with an operating arm 34 and a vent 35. A discharge pipe 36, customarily equipped with a faucet 37, is provided for each compartment of the tank and is connected by means of the threads 9 in the base 5 of the valve.

In operation, the internal valve is maintained normally closed by the compression spring 26 urging the valve sleeve 17 downward to seated position upon the base 5. With the valve sleeve in seated position as illustrated in Fig. 4, the fluid in the tank compartment cannot pass outward through its discharge pipe. When the operator desires to draw fluid from the tank, he shifts the lever 34 controlling the three-way valve 33 on the pressure line 30 so as to close the vent 35 and establish communication between the pressure reservoir 32 and the bellows 14 of the internal valves (see Fig. 6). Assuming that the reservoir 32 is properly charged, the bellows 14 will be thereupon expanded, forcing the valve sleeve 17 upward until arrested by the top 19 of the valve sleeve engaging the cap 24. (See Fig. 5.) This will unseat the valve sleeve 17 and permit fluid to pass from the tank compartment through the ports 28 and out the discharge line connected to the base 5. The fluid may be drawn from the discharge line by opening the faucet 37. When it is no longer desired to draw liquid from the tank the operating handle 34 of the three-way valve 33 may be shifted to the position illustrated in Fig. 7, thereby closing the communication between the pressure line 30 and the pressure reservoir 32 and opening the vent 35. Upon the opening of the vent 35 the pressure in the line 30 and in the bellows 14 will be released and the pressure of the compression spring 26 will cause the valve sleeve 17 to seat on the base 5, thereby closing the internal valve.

The arrangement above described is such that the internal valves are normally closed, and any injury or breakage exterior of the tank to the discharge pipes or valve control will not interfere with the valves maintaining their normal position. The pressure control is of a character which enables a safety element of various types to be readily incorporated therein. For example, the controlling valve 33 is illustrated in Fig. 1 as being positioned in the bucket-box 38 with the operating handle 34 projecting in such manner that the door 39 of the bucket-box cannot be closed unless the operating lever 34 be shifted to a position opening the vent 35. The truck operator is therefore unable to return his bucket to its proper receptacle and close the door thereof without first venting the pressure line and thereby closing the internal valves. Likewise, a link 40 (Fig. 8) may extend from the emergency brake stub shaft 41 to operate a vent 42 in the pressure line 30. With the latter arrangement, upon the release of the emergency brake, the pressure line would be vented and the internal valves closed, thereby insuring that the truck could not be moved with the internal valves open.

The internal valve above described may be applied to any tank having the customary pipe flange 4 without the necessity of remodeling the tank. The employment of the pressure control for the internal valve eliminates mechanical linkage adjustments, wear of moving parts, packing-glands, and in use requires no adjustment. The internal valve occupies a small amount of space, and the pressure control may be of lightweight character. Air is preferably employed as the pressure medium, but the use of other fluid or hydraulic medium is contemplated. A modified type of apparatus embodying the present invention and employing a fluid pressure medium is illustrated in my pending application Serial Number 747,784, filed November 4, 1924.

The invention is not limited to the details above described, but is of the full scope set forth in the following claims.

I claim:

1. In combination with a tank truck having a plurality of compartments, discharge lines from the compartments, internal valves for the discharge lines positioned at the points the lines communicate with the tank, said valves being inserted within the tank compartments from the exterior, means for detachably securing the valves in the inserted position, and a fluid pressure system communicating from the exterior of the compartments to the said valves within said compartments for operating said valves, said fluid pressure system being closed from access to the fluid within the tank.

2. In combination with a tank truck having a plurality of compartments, a discharge line leading from each compartment, a normally closed shut-off valve for the discharge line positioned within the compartment, said valves being inserted within the tank compartments from the exterior, means for detachably securing the valves in the inserted position, and a fluid pressure system communicating from the exterior of the compartment to the said valve within said compartment for operating said valve, said fluid pressure system being closed from access to the fluid within the tank.

3. In combination with a tank truck having a plurality of compartments, a discharge line for each compartment provided with an external valve, an internal valve for each discharge line, said valves being inserted into the compartment from the exterior, means exterior to the tank for detachably securing the valves in the inserted position, and a fluid pressure system operable at a point approximate the external valves and communicating with the said internal valves for operating said internal valves, said fluid pressure system being closed from access to the fluid within the compartments.

4. In combination with a tank truck having a plurality of compartments, a discharge line leading from each compartment, a normally closed internal shut-off valve positioned within each compartment at the point of communication of each compartment and its discharge line, means for opening the shut-off valves including a pressure reservoir, a pressure line leading from the reservoir to the shut-off valves and closed from access to the fluid within the compartments, and means for venting the pressure line.

5. In combination with a tank truck, an internal discharge valve positioned wholly within the tank, means accessible from the exterior of the tank for detachably securing the valve within the interior thereof, a pressure line leading to the valve and closed from access to the fluid within the tank, pressure producing means, and a controller for admitting air to the line to open the valve and for venting the line to permit closure of the valve.

6. In combination with a tank truck, an internal discharge valve positioned wholly within the tank, means within the valve for normally maintaining the valve closed, a pressure reservoir, a line between the pressure reservoir and the valve and closed from access to the fluid within the tank, and means for controlling the communication between the pressure reservoir and the line to establish communication from the reservoir to the valve or to vent the line.

7. In combination with a tank truck, a discharge valve positioned wholly within the tank, means within the valve for normally maintaining the valve in closed position, extensible means within the valve for opening the valve, and a pressure system communicating with the extensible means and operable exterior of the tank, said pressure system being closed from access to the fluid within the tank.

8. In combination with a tank truck, a normally closed discharge valve restricting the passage of fluid from the tank, a pressure system for opening the discharge valve, a vent for the pressure system, and means insuring that the vent will be open except when the tank is being purposely discharged.

9. In combination with a tank truck, a fitting positioned on the bottom of the tank, a discharge valve mounted on the fitting and supported within the tank, a normally closed sleeve valve within the valve, a member extensible under pressure to unseat the sleeve valve, and a pressure system for opening the valve and closed from access to the fluid within the tank.

10. A valve for fluid receptacles comprising a base forming a valve seat, a housing carried by the base, a sleeve valve within the housing, a spring maintaining the sleeve valve normally seated, and a member extensible under fluid pressure to unseat the sleeve valve.

11. An internal valve for fluid receptacles comprising a base forming a valve seat, a housing mounted on the base, a sleeve valve positioned within the housing, a compression spring normally maintaining the sleeve valve seated, a bellows carried by the base and extending within the sleeve valve and extensible under pressure to unseat the sleeve valve.

12. An internal valve for fluid receptacles comprising a base forming a valve seat, a housing carried by the base, a sleeve valve positioned within the housing, a cap on the housing, a compression spring interposed between the sleeve valve and the cap normally maintaining the sleeve valve seated, a bellows mounted on the base and extending within the valve and extensible under pressure to unseat the sleeve valve.

13. A valve for fluid receptacles comprising a base forming a valve seat, a sleeve valve centrally aligned above the base, an extensible member operable by fluid pressure to unseat the sleeve valve, a fluid pressure system for actuating the extensible member, and means normally yieldably urging the valve sleeve to the seated position.

14. An internal valve for fluid receptacles comprising a base forming a valve seat, a normally seated sleeve valve aligned above the base, an extensible member positioned within the sleeve valve, and a pressure system for actuating the extensible member to unseat the sleeve valve.

15. In combination with a tank truck, an internal discharge valve for the tank, means yieldably holding the valve in a closed position, fluid pressure actuated means for forcing the valve open, and means connected with one of the operating levers of the truck for venting the fluid pressure to permit the valve to close.

16. An internal valve for fluid receptacles comprising a base forming a valve seat, a housing carried by the base, a sleeve valve positioned within the housing, a cap on the housing, a compression spring interposed between the sleeve valve and cap and normally maintaining the sleeve valve seated, and fluid actuated means mounted on said base and extending within the housing to unseat the said sleeve valve.

17. An internal valve for fluid receptacles comprising a base forming a valve seat, a housing carried by the base, a sleeve valve positioned within the housing, a cap on the housing, a compression spring interposed between the sleeve valve and cap and normally maintaining the sleeve valve closed, and fluid actuated means within the housing for unseating the said sleeve valve.

18. A vehicle having a tank with a fluid outlet in its wall, a delivery pipe for said outlet and extending to a point of discharge exterior of the tank, a fluid operated self-closing valve member mounted within the tank and movable to control said outlet, and means communicating from the exterior of the tank to within said valve member for applying fluid pressure to operate said valve, said means being closed from access to the fluid within the tank.

19. A vehicle having a tank with a fluid outlet in its wall, a delivery pipe for said outlet and extending to a point of discharge exterior of the tank, a normally closed fluid actuated valve mounted within the tank and adapted to control said outlet, actuating means embodied in said valve and extensible under fluid pressure to unseat said valve, and means communicating from the exterior of the tank for applying fluid pressure to said actuating means, said two named means being closed from access to the fluid within the tank.

20. An internal valve for fluid receptacles having a ported casing; a cylindrical valve mounted to reciprocate within the casing; means mounted between the casing and the valve for yieldably interposing the cylinder between the casing ports and a fluid outlet; means mounted within the cylindrical valve and operated from an external source of pressure for moving the valve against the yieldable means to allow the flow of fluid through the ports, and means for preventing the flow of fluid through the ports on failure of the exterior source of pressure.

21. An internal valve for fluid receptacles having a base, a perforated casing supported by the base, a passage for fluid formed through the base, a sleeve valve yieldably held in position to close the passage of fluid through the perforations of the casing and the passage through the base, and fluid pressure operated means for forcing the sleeve valve against the yieldable holding means to permit flow through the said perforations and passage through the base.

22. An internal valve for fluid receptacles having a base providing a fluid passage, a perforated casing, a sleeve valve mounted to reciprocate within the casing, means mounted between the casing and the valve for yieldably urging the sleeve to position to close the passage of fluid through the perforations and fluid passage formed through said base, and means mounted within the sleeve valve and operated from an external source of pressure for moving the valve against the yieldable means to allow the fluid to flow through the perforations and the said passage formed through the base so that on failure of the exterior source of pressure the valve sleeve will hold the passage formed through the said perforations and passage formed through the base closed.

23. An internal valve for a fluid receptacle comprising a base member having fluid passage formed therethrough, the base member being movably secured from the exterior to the receptacle, a casing secured to the base member having a plurality of perforations formed therein, a sleeve valve mounted within the casing and adapted to seat on a valve seat formed in the base member to close the flow from the receptacle through the perforations and the passage formed through the base member, and means external from the receptacle for supplying force to raise the valve from the seat to permit the fluid to flow from the receptacle through the passage formed in the base member.

24. An internal valve for a fluid receptacle comprising a base member having a central passage, a casing secured to the base member, a plurality of perforations formed in one end of the casing, a sleeve valve mounted within the casing, a seat, means for yieldably forcing the sleeve valve to engage the seat so as to prevent flow of fluid from the fluid receptacle through the perforations and said central passage, and bellows mounted within the sleeve and adapted to be expanded by fluid pressure to move the sleeve valve to permit flow of fluid from the receptacle through said central passage.

25. In combination with a tank truck, a base, means for retachably securing the base to the exterior of the tank, a passage formed in the base and communicating with a discharge conduit, a housing carried by the base, a valve seat formed in the base, a sleeve valve positioned within the housing, a cap on the housing, a plurality of perforations formed in the casing, a compression spring interposed between the sleeve valve and the cap normally maintaining the sleeve valve seated to prevent flow of fluid from the tank through the passage formed in the base member, a bellows mounted on the base and extending within the sleeve valve and extensible under pressure to unseat the sleeve valve.

26. The combination with a tank having an annular flange, of an internally mounted fluid actuated discharge valve including a base adapted to be secured to said tank at said flange, said base providing a fluid discharge passage from said tank, a web secured to said base, a valve sleeve adapted to seat on said base member to close said fluid discharge passage, means for conducting fluid under pressure through said base member to raise said valve sleeve from said seat, and means interposed between said valve sleeve and said base member for yieldably urging said valve sleeve toward said seat when the air under pressure is dispersed.

27. In combination with a tank having a discharge opening therein, a discharge valve wholly housed within the tank, said discharge valve comprising a base member insertable into said discharge opening from the exterior of the tank, and providing a discharge outlet, an annular seat on said base member, a hub member in line with the axis of said base member, supporting members connecting said hub to said base, an annular valve adapted to coact with said valve seat, fluid actuated means associated with said hub for operating said valve, and a conduit extending from said fluid actuated means through said hub and to the exterior of the tank and to the exterior of the discharge outlet.

28. An internal valve for a fluid receptacle comprising a base adapted to be inserted into the receptacle from the exterior, a discharge outlet extending through said base, a hub member in said discharge outlet, supporting members connecting said hub to said base, a conduit communicating at one end with the outer and lower surface of said base and extending through said supporting member and communicating at its other end with the upper end of said hub, an annular valve seat on said base, an annular valve coacting with said valve seat, extensible fluid operated means associated with said valve and said hub for actuating said valve, and means for automatically closing said valve when the pressure in said conduit is released.

29. An internal valve for fluid receptacles comprising a base adapted to be inserted into the receptacle from the exterior, a discharge outlet extending through said base, a hub member in said discharge outlet, supporting members connecting said hub member to said base, a conduit communicating at one end to the outer and lower surface of the base and extending through said supporting member and communicating at its other end with the upper end of said hub member, an annular seat on said base, an annular valve coacting with said valve seat, fluid operated means associated with said valve and said hub member for raising said valve from said seat, and spring means for closing said valve when the pressure in said conduit is released.

Signed at San Francisco, California, this 23rd day of January, 1924.

JOSEPH HAMBRIC McEACHERN.